United States Patent
Kagami et al.

(10) Patent No.: US 12,118,260 B2
(45) Date of Patent: *Oct. 15, 2024

(54) VEHICLE DISPLAY DEVICE

(71) Applicant: TOYOTA JIDOSHA KABUSHIKI KAISHA, Toyota (JP)

(72) Inventors: Ayaka Kagami, Inazawa (JP); Atsushi Hanawa, Miyoshi (JP); Soshiro Murata, Nagoya (JP); Hideo Hasegawa, Nagoya (JP); Genshi Kuno, Toyota (JP); Yuta Kikuzaki, Tokyo (JP); Yuu Oomi, Tokyo (JP); Takeshi Yamada, Anjo (JP); Masako Furuta, Kariya (JP); Toshihisa Shimome, Gifu (JP); Kensuke Sasaki, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/379,921

(22) Filed: Oct. 13, 2023

(65) Prior Publication Data

US 2024/0036793 A1 Feb. 1, 2024

Related U.S. Application Data

(63) Continuation of application No. 17/514,445, filed on Oct. 29, 2021, now Pat. No. 11,822,845.

(30) Foreign Application Priority Data

Dec. 17, 2020 (JP) ................. 2020-208932

(51) Int. Cl.
*G06F 3/14* (2006.01)
*H04N 21/414* (2011.01)

(52) U.S. Cl.
CPC ......... *G06F 3/14* (2013.01); *H04N 21/41422* (2013.01)

(58) Field of Classification Search
CPC ............................ G06F 3/14; H04N 21/41422
See application file for complete search history.

(56) References Cited

U.S. PATENT DOCUMENTS

| 7,996,422 | B2 | 8/2011 | Shahraray et al. |
| 11,822,845 | B2 * | 11/2023 | Kagami ........... H04N 21/41422 |
| 2003/0114968 | A1 | 6/2003 | Sato et al. |
| 2005/0182564 | A1 * | 8/2005 | Kim ................... G01C 21/3679 |
| | | | 701/468 |

(Continued)

FOREIGN PATENT DOCUMENTS

| EP | 3 722 948 A1 | 10/2020 |
| JP | 2009-294790 A | 12/2009 |

(Continued)

OTHER PUBLICATIONS

Oct. 3, 2022 Office Action issued in U.S. Appl. No. 17/514,445.

(Continued)

*Primary Examiner* — James R Sheleheda
(74) *Attorney, Agent, or Firm* — Oliff PLC

(57) ABSTRACT

A vehicle display device that is mounted on a vehicle moving toward a destination does not display a content shown in the destination but displays a video related to the content and a video other than a video provided in the destination.

4 Claims, 5 Drawing Sheets

(56) References Cited

U.S. PATENT DOCUMENTS

| | | |
|---|---|---|
| 2007/0067104 A1* | 3/2007 | Mays ................. G01C 21/3647 701/437 |
| 2009/0276154 A1* | 11/2009 | Subramanian ......... G01C 21/20 701/469 |
| 2009/0318777 A1 | 12/2009 | Kameyama |
| 2010/0023544 A1 | 1/2010 | Shahraray et al. |
| 2012/0036467 A1* | 2/2012 | Tom ..................... G06Q 10/047 715/772 |
| 2012/0095675 A1* | 4/2012 | Tom ..................... G01C 21/343 701/425 |
| 2012/0143980 A1* | 6/2012 | Johansson ............. H04W 4/024 709/217 |
| 2014/0279200 A1 | 9/2014 | Hosein et al. |
| 2017/0315771 A1 | 11/2017 | Kerr |
| 2018/0018139 A1 | 1/2018 | Watanabe et al. |
| 2018/0188054 A1 | 7/2018 | Kennedy et al. |
| 2018/0357233 A1 | 12/2018 | Dazé et al. |
| 2019/0124301 A1 | 4/2019 | Yoshii et al. |
| 2020/0017026 A1 | 1/2020 | Kumar et al. |
| 2020/0329342 A1 | 10/2020 | Beaurepaire et al. |
| 2022/0074756 A1 | 3/2022 | Gewickey et al. |
| 2022/0197579 A1 | 6/2022 | Kagami et al. |
| 2022/0197928 A1 | 6/2022 | Kagami et al. |
| 2022/0201254 A1 | 6/2022 | Kagami et al. |
| 2022/0347567 A1 | 11/2022 | Lake-Schaal et al. |

FOREIGN PATENT DOCUMENTS

| | | |
|---|---|---|
| JP | 2011-115968 A | 6/2011 |
| JP | 2018-163650 A | 10/2018 |
| JP | 2020-165797 A | 10/2020 |
| WO | 2007/109044 A1 | 9/2007 |
| WO | 2016/054300 A1 | 4/2016 |
| WO | 2017/208719 A1 | 12/2017 |
| WO | 2020/132200 A1 | 6/2020 |
| WO | 2020/163801 A1 | 8/2020 |

OTHER PUBLICATIONS

Feb. 23, 2023 Office Action issued in U.S. Appl. No. 17/514,445.
Jul. 3, 26, 2023 Notice of Allowance issued in U.S. Appl. No. 17/514,445.

* cited by examiner

VEHICLE DISPLAY DEVICE

CROSS-REFERENCE TO RELATED APPLICATION

This application is a Continuation of application Ser. No. 17/514,445, filed on Oct. 29, 2021, which claims priority to Japanese Patent Application No. 2020-208932, filed on Dec. 17, 2020. The prior applications are hereby incorporated by reference in their entirety.

BACKGROUND

1. Technical Field

The present disclosure relates to a vehicle display device mounted on a vehicle that moves toward a destination.

2. Description of Related Art

It has been proposed that videos are displayed on an inner wall surface of a vehicle since passengers often get bored with just seeing a landscape outside of the vehicle while the vehicle is moving. WO 2017/208719 describes that various videos are displayed on the inner wall surface of the vehicle. The inner wall surface includes a window, and in an autonomous driving vehicle, a front window is also included in the inner wall surface for displaying the videos. The videos to be displayed may be commercial contents such as movies, videos taken by an in-vehicle camera, videos taken by a drone, archived videos, and the like. The videos are displayed in a non-transparent mode and a transparent mode as needed. In the transparent mode, the passengers can see the landscape.

SUMMARY

However, WO 2017/208719 does not describe an effective use of a time required to reach a specific destination in relation to the destination.

The present disclosure relates to a vehicle display device mounted on a vehicle moving toward a destination. The vehicle display device does not display a content shown in the destination but displays a related video related to the content and a video other than a video provided in the destination.

The related video may be a video that is associated with the content.

The video that is associated with the content may include a video of a location used when the content was created, a video about a birthplace of a creator of the content, and a video about a location of an object referenced when the content was created.

The destination may be an entertainment facility.

According to the present disclosure, it is possible to see a content that is not the content itself shown in the destination, so that users' understanding of the destination is deepened.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described with reference to the drawings. The present disclosure is not limited to the embodiment described below.

Vehicle Operation Mode

In the embodiment, entertainment facilities that entertain visitors under a specific theme (concept) are focused as a destination to visit. In such entertainment facilities, the culture of a specific country, stories, movies, etc. are often set as one of the themes. Note that the destination is not limited to the above entertainment facilities, and may include a zoo or a park.

Figure 1:
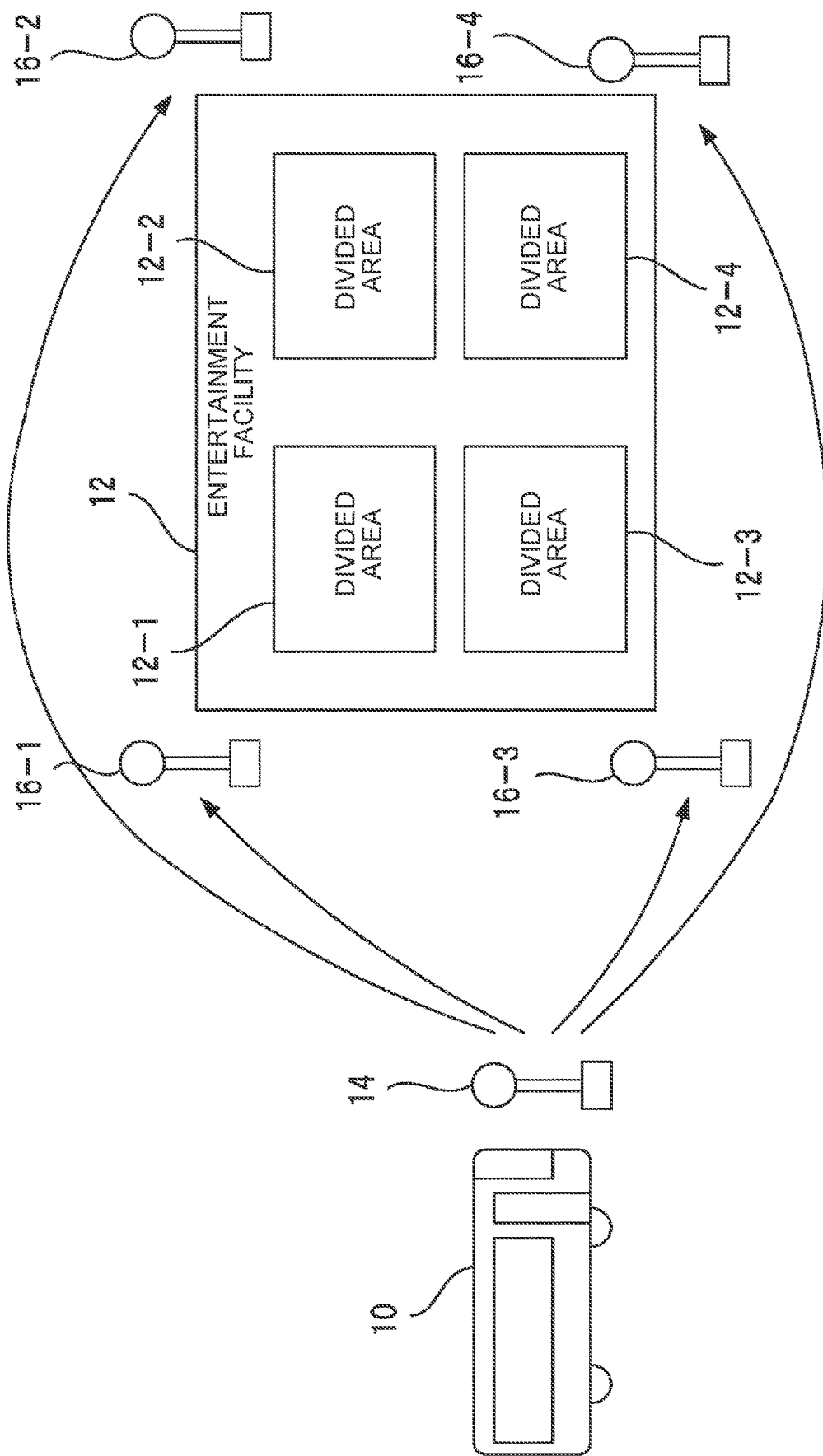
FIG. 1 schematically shows an operation mode of a vehicle equipped with a vehicle display device according to an embodiment.

FIG. 1 schematically shows an operation mode of a vehicle equipped with a vehicle display device according to the embodiment. In this example, a vehicle 10 operates from one terminal stop 14 to a stop 16-n (16-1 to 16-4) in an entertainment facility 12. As the terminal stop 14, the nearest railway station to the entertainment facility 12 or the like is assumed. The vehicle 10 may be a private car or the like.

The entertainment facility 12 is divided into four areas 12-1, 12-2, 12-3, and 12-4 for four themes 1 to 4 with different concepts. The stops 16-1, 16-2, 16-3, and 16-4 are provided corresponding to the divided areas 12-1, 12-2, 12-3, and 12-4, respectively. In this example, the divided areas 12-1, 12-2, 12-3, and 12-4 are destination points. Since the divided areas 12-1, 12-2, 12-3, and 12-4 and the stops 16-1, 16-2, 16-3, and 16-4 are not limited to four, any one of the divided areas and any one of the stops are expressed as a divided area 12-n and a stop 16-n (n is a natural number), respectively.

In this example, the vehicle 10 is a shared bus, and directly goes to any one of the stops 16-n (16-1, 16-2, 16-3, and 16-4) from the terminal stop 14. The vehicle may directly go to one stop 16-n, and then sequentially stop at another stop 16-n.

Vehicle Configuration

Configuration for Display Control

Figure 2:
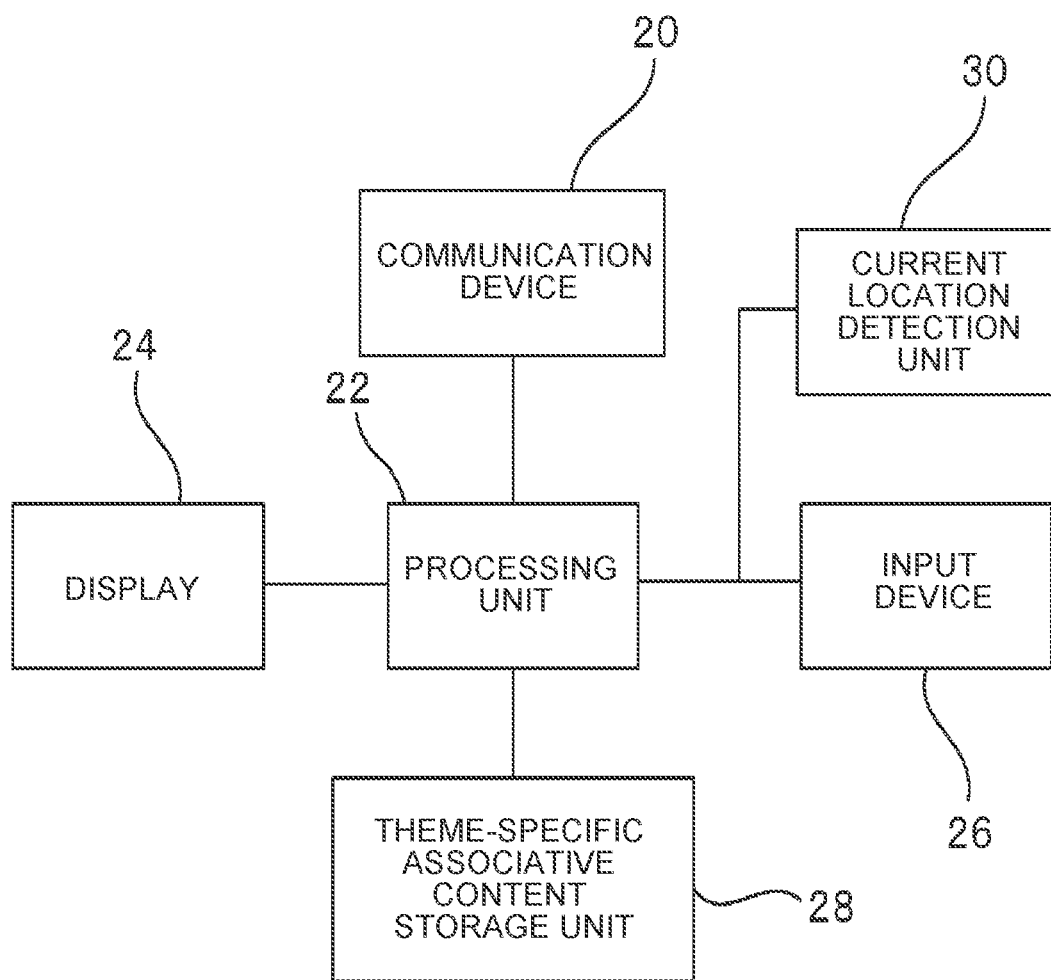
FIG. 2 is a diagram showing a configuration of a display control device mounted on the vehicle.

FIG. 2 is a diagram showing a configuration of a display control device mounted on the vehicle 10. A communication device 20 is connected to a communication line such as the Internet via wireless communication, and performs processing for various communications. In this example, communication with a management computer in the entertainment facility 12 is possible.

A processing unit 22 is connected to the communication device 20, and the processing unit 22 performs various types of data processing. A display 24 as display means and an input device 26 are connected to the processing unit 22. A liquid crystal, an organic electro luminescence (EL), a projection display, etc. can be adopted for the display 24 for displaying videos on an inner wall surface of the vehicle 10.

Further, a theme-specific associative content storage unit 28 is connected to the processing unit 22, and information on an associative content for each of the divided areas 12-n is stored therein.

Here, as the theme-specific associative content, the following examples can be mentioned.

Information on various sacred sites when a theme is related to pilgrimage to the sacred sites Area information related to a character of a theme Information on adventurous sites (e.g. sea, mountains) when a theme is related to adventure Information on fantastic sites (e.g. zoo) when a theme is related to fantasy Video of a location used when the content of a theme was created Video of a birthplace of a creator of the content Video about a location of an object referenced when the content was created As described above, the video about items that are not directly related to the content but are associated with the content is stored in the theme-specific associative content storage unit 28.

A current location detection unit 30 for detecting a current location of the vehicle 10 is connected to the processing unit 22. A global navigation satellite system (GNSS) such as Global Positioning System (GPS) is adopted for the current location detection unit 30.

As will be described later, since the video of the divided area 12-n in which users will arrive is read from the related video of each divided area 12-n stored in the theme-specific associative content storage unit 28, and then displayed and played, the users can obtain prior knowledge about the divided area 12-n that is a destination, so that the users can further enjoy the destination. The theme-specific associative content storage unit 28 may temporarily store the theme-specific associative content distributed via the communication device 20.

Configuration of Vehicle

The configuration of the vehicle 10 for transporting the users from the terminal stop 14 to the stop 16-n will be described. The vehicle 10 may be a manually driven vehicle operated by a driver or an autonomous driving vehicle. Regarding the autonomous driving vehicle, for example, based on the standards set by the Society of Automotive Engineers (SAE International), it is preferable that the vehicle 10 operate at level 4 (highly automated driving) or level 5 (fully automated driving).

Figure 3:
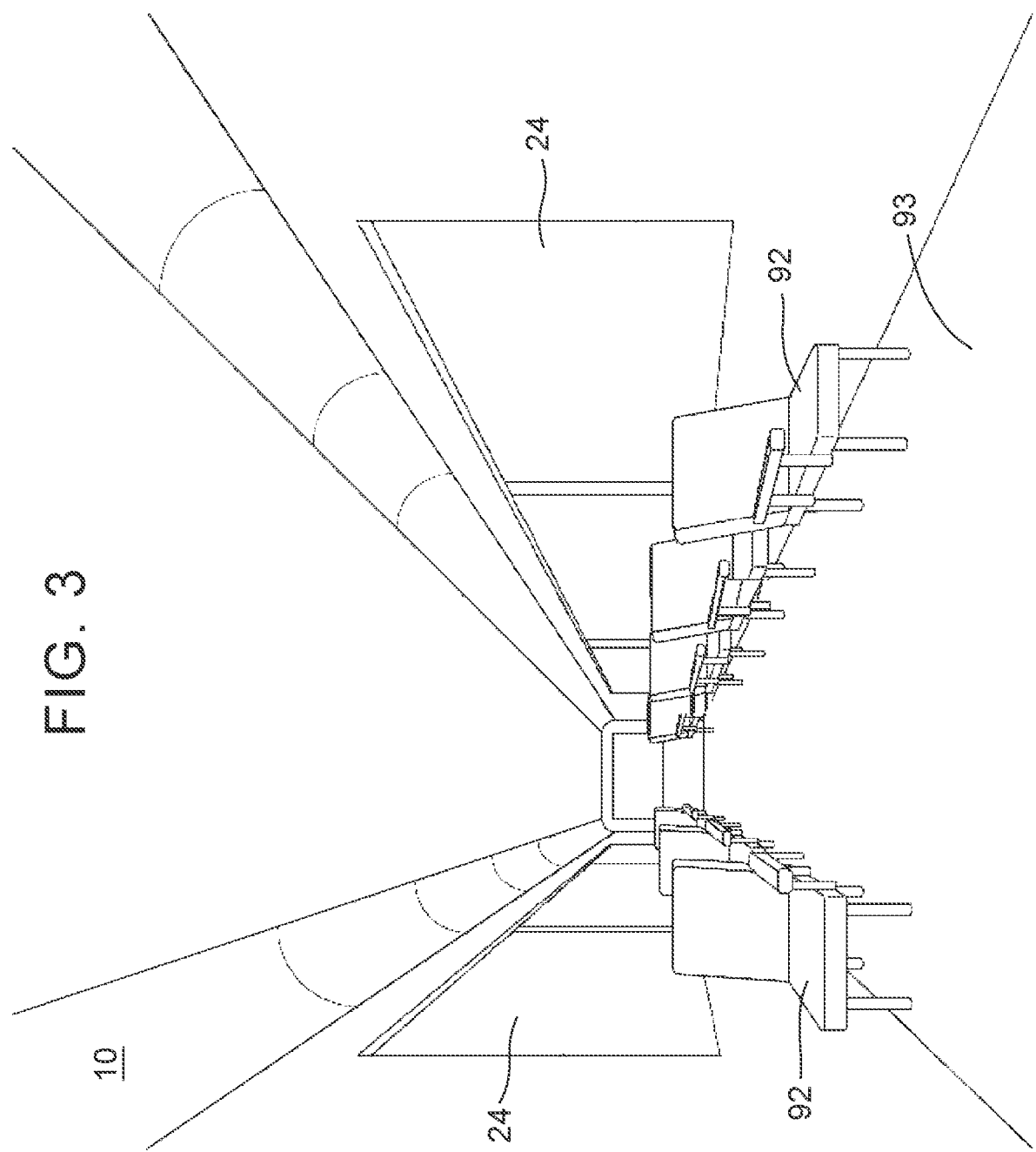
FIG. 3 is a diagram illustrating a state of a vehicle cabin of the vehicle.

FIG. 3 illustrates a state of a vehicle cabin of the vehicle 10. A plurality of seats 92 is arranged in the vehicle cabin in the longitudinal direction of the vehicle 10. Further, an aisle 93 is provided in the center of the vehicle cabin in the vehicle width direction. The aisle 93 extends in the longitudinal direction of the vehicle 10. A row of the seats 92 extends in the longitudinal direction of the vehicle 10 on each side of the aisle 93.

The display 24 is provided as a vehicle window of the vehicle 10. That is, in this vehicle 10, instead of providing glass windows as vehicle windows on the right and left sides of the vehicle, the display 24 is provided. The display 24 is arranged such that a display surface of the display 24 faces the vehicle cabin. The display 24 can have both a transparent mode and a non-transparent mode by using, for example, an organic EL display.

Figure 4:
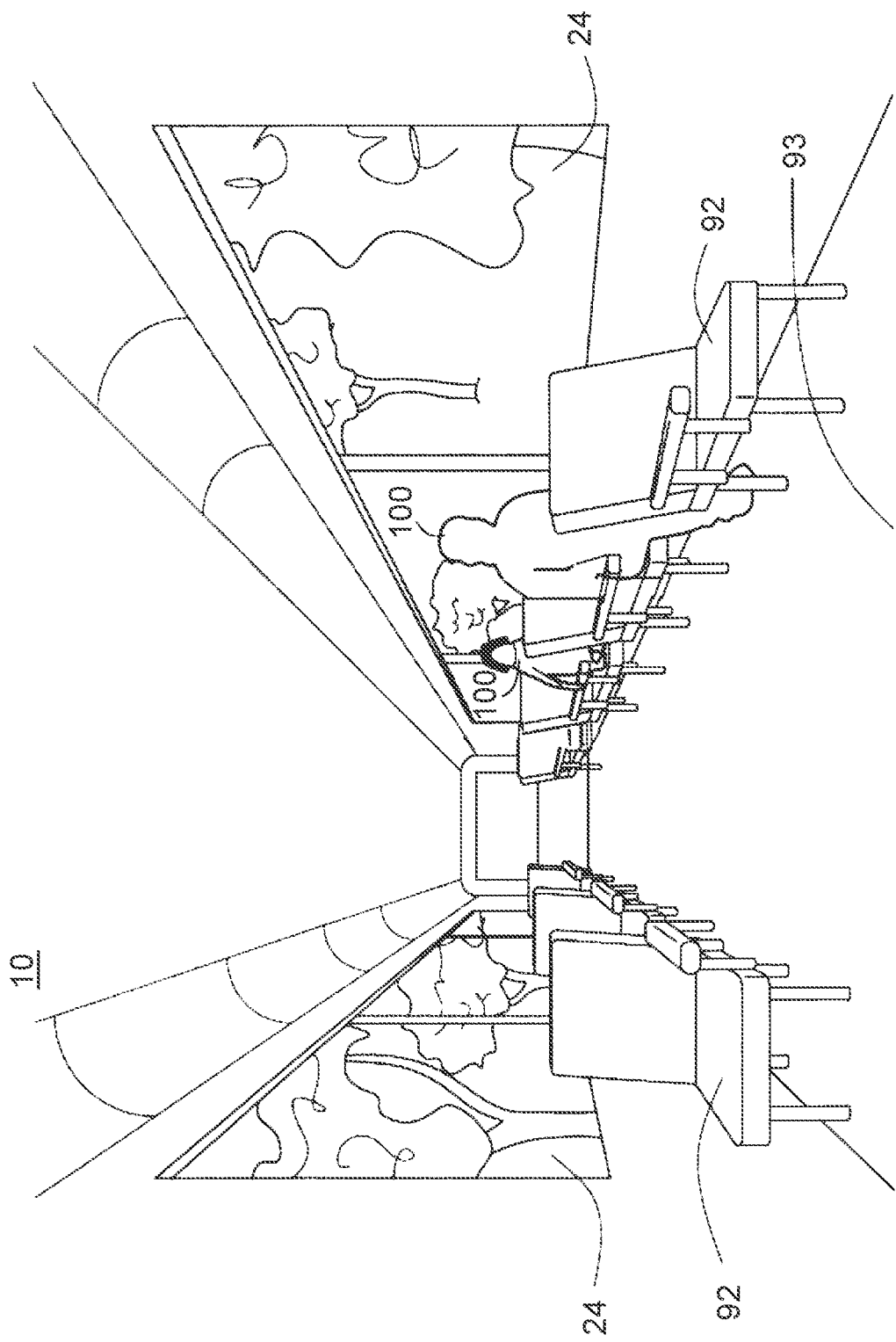
FIG. 4 is a diagram showing an example of displaying a scenery of an entertainment facility in the vehicle cabin of the vehicle.

Then, for example, as shown in FIG. 4, the display 24 displays the video associated with the divided area 12-n that is a destination.

In the autonomous driving vehicle, the front window may also serve as the display 24 for displaying the video. Further, in a normal vehicle, a partition may be provided between the driver's seat and the passenger's seat, and the display 24 may be installed in the area. Further, the display 24 may be provided on the ceiling or the like. The passengers cannot see the landscape when the display 24 installed in a place other than the window stops displaying the video. Therefore, during the period for which the video is not displayed on the window, the landscape outside of the vehicle 10 may be captured and displayed, or a video prepared in advance may be displayed on the place. The passengers can also see the landscape outside of the vehicle 10 in the transparent mode of the display 24.

Further, in this example, the display 24 itself can be switched between the transparent mode and the non-transparent mode, but the display 24 may be physically movable.

Note that, in FIG. 3, the landscape outside of the vehicle 10 is omitted for convenience, and in FIG. 4, the forest is displayed for convenience, and passengers 100 are also shown.

Video Display Processing

First, a related video is created according to each divided area 12-n. This related video is not directly related to the content of the divided area 12-n but is a video that is not shown in the divided area 12-n. This related video may include an interview with a creator, storyboards, filmmaking secrets, and the like.

Further, it is preferable that the length of the video be within the moving time of the vehicle 10, a plurality of videos that lasts a comparatively short period of time be prepared, or videos that last various periods of time be prepared. As a result, it is possible to display the videos in an appropriate combination according to the time required for the vehicle 10 to reach the divided area 12-n.

In addition, the landscape of the route of the vehicle 10 is studied, and objects to be shown and objects not to be shown are specified.

Figure 5:
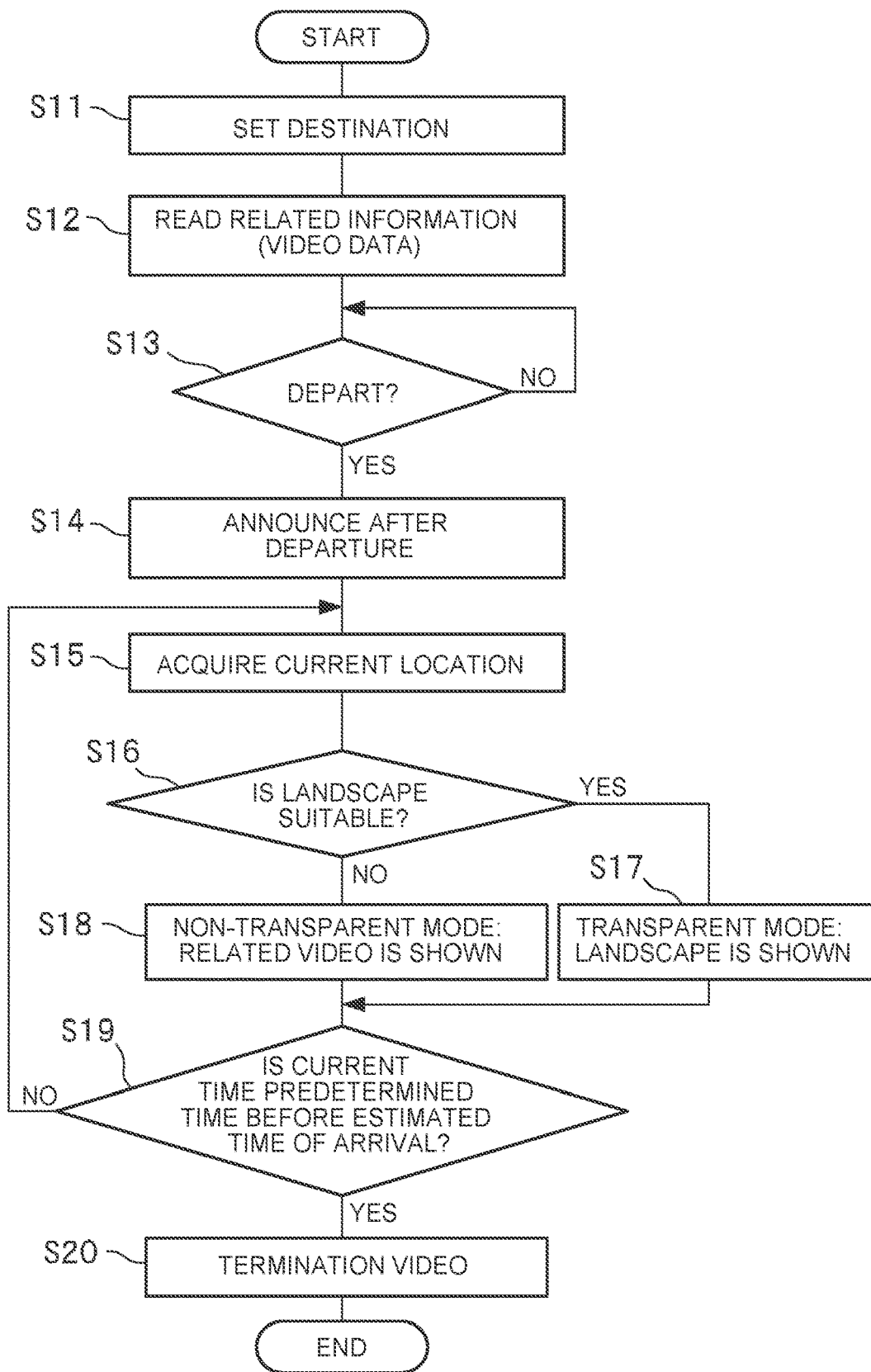
FIG. 5 is a flowchart showing a video display process in the vehicle.

FIG. 5 is a flowchart showing a video display process in the vehicle 10. First, a destination is set (S11). In this example, the vehicle 10 is a shared bus whose destination is the entertainment facility 12, and any one of the stops 16-n is set as the destination. When the destination is set, the related information (video data) about the destination is read (S12).

Then, when the vehicle 10 departs for the destination (YES in S13), an announcement is issued after departure (S14), and the current location detection unit 30 acquires the current location (S15).

Then, it is determined whether the landscape of the current location is suitable to be shown (S16). When the landscape is suitable, the display 24 is set to the transparent mode and the landscape is shown (S17). When the landscape is not suitable, the display 24 is set to the non-transparent mode and the video obtained by playing the video data prepared in advance is shown (S18). Note that the landscape to be shown and not to be shown includes objects such as specific buildings, monuments, and signboards.

Then, it is determined whether the current time is a predetermined time before the estimated time of arrival at the destination (S19). When the current time is not the predetermined time before the estimated time, the process returns to S15 and the control of the display 24 is repeated. When the current time is the predetermined time before the estimated time, a termination process for playing termination videos is performed (S20).

As described above, in the embodiment, the landscape of the traveling route of the vehicle 10 is checked, and the relationship with the target divided area 12-*n* is studied. In this study, objects to be shown and objects not to be shown are determined. For example, information boards, buildings, and characters related to the target divided area 12-*n* correspond to the objects to be shown, and objects related to another divided area 12-*n* correspond to the objects not to be shown. When the vehicle 10 is traveling, a video associated with a theme is displayed while the landscape not to be shown is not shown and the landscape to be shown is shown. As a result, the users can further obtain the knowledge about the divided area 12-*n* that is a destination, and further enjoy the destination.

What is claimed is:

1. A control method performed by a vehicle display device mounted on a vehicle moving toward a destination, the destination being one area of a plurality of divided areas, each of the plurality of divided areas having a different concept, the vehicle display device comprising a display provided as a window and having a transparent mode and a non-transparent mode, the control method comprising:
   analyzing a relationship between objects in a landscape of a traveling route of the vehicle and the concept of the destination,
   determining whether the objects in the landscape are related to the concept of the destination,
   setting the display to the transparent mode when the vehicle travels near objects determined to be related to the concept of the destination and displaying a video associated with the destination that includes objects in the landscape determined to be related to the concept of the destination, and
   setting the display to the non-transparent mode when the vehicle travels near objects related to the concept of another divided area and not the concept of the destination and displaying a video associated with the destination that excludes objects in the landscape determined to be related to the concept of the another divided area and not the concept of the destination.

2. The control method according to claim 1, further comprising displaying a related video associated with the concept of the another divided area,
   wherein the related video is a video that is associated with a content of the video associated with the destination.

3. The control method according to claim 2, wherein the related video is at least one of a video of a location used when the content was created, a video about a birthplace of a creator of the content, and a video about a location of an object referenced in the video associated with the destination when the content was created.

4. The control method according to claim 1, wherein the destination is an entertainment facility.

* * * * *